United States Patent
Tsoutsaios

(10) Patent No.: US 10,516,786 B2
(45) Date of Patent: *Dec. 24, 2019

(54) APPARATUS AND METHODS FOR AUDIO AND/OR VIDEO COMMUNICATION

(71) Applicant: Unify Patente GmbH & Co. KG, Munich (DE)

(72) Inventor: Antonios Tsoutsaios, Athens (GR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,263

(22) Filed: Feb. 12, 2019

(65) Prior Publication Data

US 2019/0191036 A1    Jun. 20, 2019

Related U.S. Application Data

(63) Continuation of application No. 15/858,245, filed on Dec. 29, 2017, now Pat. No. 10,250,758.

(30) Foreign Application Priority Data

Jan. 4, 2017    (EP) .................................. 17020004

(51) Int. Cl.
*H04M 15/02*    (2006.01)
*H04M 1/725*    (2006.01)
(Continued)

(52) U.S. Cl.
CPC ....... *H04M 15/888* (2013.01); *H04M 1/2478* (2013.01); *H04M 1/7258* (2013.01);
(Continued)

(58) Field of Classification Search
CPC ........... H04M 15/888; H04M 1/72519; H04M 1/72583; H04M 1/72558; H04M 1/2478;
(Continued)

(56) References Cited

U.S. PATENT DOCUMENTS 5,884,180 A    3/1999  Bertacchi
5,903,852 A    5/1999  Schaupp, Jr. et al.
(Continued)

FOREIGN PATENT DOCUMENTS

EP    2472839 A1    7/2012

OTHER PUBLICATIONS

European Search Report for EP17020004.2 dated Jul. 6, 2017.
Extended European Search Report for EP17020004.2 dated Sep. 21, 2017.

*Primary Examiner* — Stella L. Woo
(74) *Attorney, Agent, or Firm* — Buchanan Ingersoll & Rooney PC

(57) ABSTRACT

An improved apparatus for audio and/or video communication includes first input means for calling another apparatus for audio and/or video communication, and second input means for terminating a call. The apparatus is configured to assign a first functionality to the second input means and a second functionality different from the first functionality to the second input means Activation of the first and second functionality is dependent upon a status of the audio and/or video communication.

20 Claims, 11 Drawing Sheets

(51) Int. Cl.
*H04N 7/14* (2006.01)
*H04M 1/247* (2006.01)
*G06F 3/0488* (2013.01)

(52) U.S. Cl.
CPC ... *H04M 1/72519* (2013.01); *H04M 1/72558* (2013.01); *H04M 1/72583* (2013.01); *H04N 7/147* (2013.01); *G06F 3/0488* (2013.01); *H04M 2250/22* (2013.01)

(58) Field of Classification Search
CPC .......... H04M 1/7258; H04M 2250/22; H04N 7/147; G06F 3/0488
See application file for complete search history.

(56) References Cited

U.S. PATENT DOCUMENTS

| | | | |
|---|---|---|---|
| 6,636,606 | B1 | 10/2003 | Lissner et al. |
| 9,756,164 | B2 | 9/2017 | Blonski |
| 10,250,758 | B2 * | 4/2019 | Tsoutsaios ........ H04M 1/72519 |
| 2006/0058063 | A1 | 3/2006 | Booking et al. |
| 2009/0149153 | A1 | 6/2009 | Lee |
| 2014/0195247 | A1 | 7/2014 | Parkinson et al. |
| 2015/0148012 | A1 | 5/2015 | Bhide et al. |
| 2016/0261996 | A1 | 9/2016 | Malik et al. |
| 2017/0078473 | A1 | 3/2017 | DeLuca et al. |
| 2018/0152558 | A1 | 5/2018 | Chan et al. |

* cited by examiner

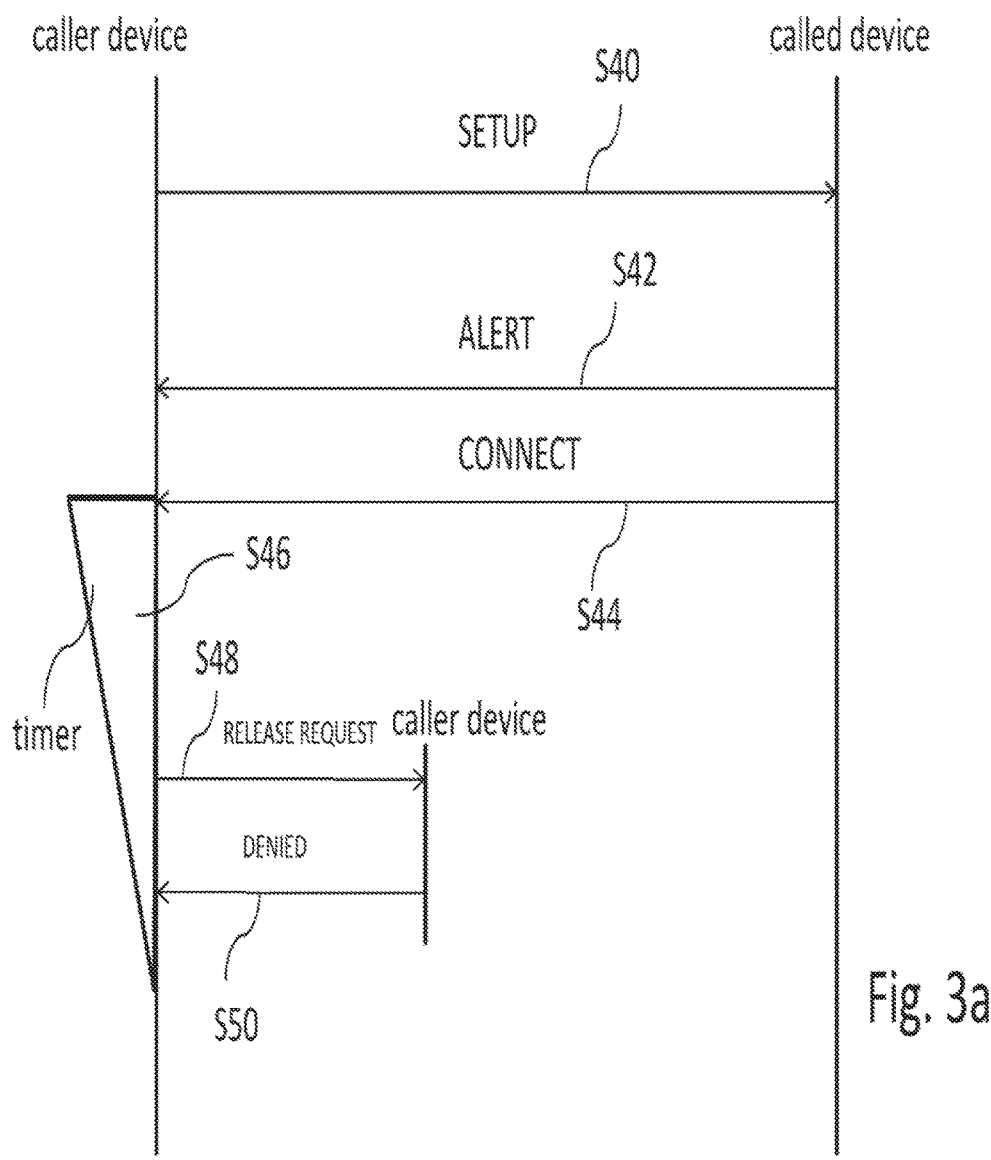

APPARATUS AND METHODS FOR AUDIO AND/OR VIDEO COMMUNICATION

CROSS-REFERENCE TO RELATED APPLICATIONS

This application is a continuation application of U.S. patent application Ser. No. 15/858,245, which claims priority to European Patent Application No. 17 020 004.2, filed Jan. 4, 2017.

FIELD OF THE INVENTION

The present application relates to an apparatus for audio and/or video communication, and to methods of operating such apparatus.

BACKGROUND OF THE INVENTION

An apparatus for audio and/or video communication includes first input means for calling another apparatus for audio and/or video communication, and second input means for terminating a call.

The second input means are preferably different from the first input means input means are understood to comprise separate physical input means, such as keys, switches, buttons and the like, as well as virtual input means, for example in the form of predetermined areas, icons or the like on an input device such as a touch screen.

When calling another apparatus by means of the above-mentioned apparatus, it may happen that it takes too long a time for establishing the call the other party is called but does not yet accept the call. It then might occur that the second input means for terminating a call is activated at a point in time, where just the call has been accepted. That means that the intended termination of the call when it is not yet established leads to costs for the established call, and the other party is annoyed since the person has received a call and nobody responds. After that missed call, both may be trying to reach each other, leading to further confusion.

U.S. Pat. No. 5,884,180 A discloses a method of providing a delayed connection announcement to a mobile subscriber within a radio telecommunication system This document deals as well with die question that the voice connection with the calling party is delayed, and the called party may prematurely terminate the call by hanging up. The solution found in U.S. Pat. No. 5,884,180 A is to use alerting signals. That appears to be rather complicated.

U.S. Pat. No. 6,636,606 B1 discloses a keypad button guard for protecting against inadvertent use of a key.

SUMMARY OF THE INVENTION

It is an object of the present invention to provide an apparatus of the above-captioned kind, wherein measures are taken to reduce confusion by hanging up calls which just have been established.

A further object of the present invention is to provide a method of operating an apparatus, by means of which another apparatus is called.

Finally, a further object of the present invention is to provide a method of operating an apparatus for audio and/or video communication which receives a call The above objects are solved by the subject-matter of the independent claims. Namely, an apparatus for audio and/or video communication of the above mentioned type is configured to assign a first functionality to the second input means and a second functionality different from the first functionality to the second input means, wherein an activation of the first and second functionality is dependent on a status of audio and/or video communication With a first status, there might be the activation of the first functionality and with a second status an activation of the second functionality.

By introducing the second functionality which is active dependent on the status of audio and/or video communication, there might be a status well-defined avoiding the above-mentioned problems with just established calls.

The status of the audio and/or video communication may relate to whether or not a call to another apparatus for audio and/or video communication initiated by an input via the first input means has been accepted by means of the other apparatus, and al the same time whether communication is established for a duration lower than a first predetermined period. Hence, the above-mentioned problem is directly solved by a good definition of the status.

Therein, preferably, the second functionality includes terminating a call or an established communication only if a further condition is met. That allows for a time delay, letting the calling person think about the requested call and later-on input a request for terminating it.

Moreover, the further condition is fulfilled if there is again an input via the second input means or if there is a further input via a third input means different from the first and second input means. Hence, for instance, the user has to push a further button or icon on a touch screen for really and finally terminating a call or an established communication.

Additionally or alternatively thereto, the further condition is not fulfilled if there is again an input via the first input means or a further input via a fourth input means different from the first input means (and of the third input means, if any). In other words, the user calling another person might actively select to continue the calling when being informed that a call has just been established.

In an alternative to the above-mentioned preferred situation, the second functionality includes not to terminate a call or an established communication. This simply stops the possibility of the user to terminate the call and does not necessarily offer anything supplementary.

In a preferred embodiment of the inventive apparatus, the apparatus is configured such that if the second functionality is activated, the apparatus changes its mechanical state, its state of acoustic emission, and/or a display state. By these features, the user of the apparatus is informed that the status of audio and/or video communication is of such a kind that the second functionality is active Preferably therein, the apparatus is a tablet computer or a smartphone including a touch screen and the second input means is defined as a field displayed on the touch screen, wherein upon activation of the second functionality, the field is changed in its position, its size, its color, its filling pattern and/or its filling text Hence, there is specific design of the display state readily apparent to the user and informing about the functionality being active.

The second input means is preferably configured to receive input in a first manner if the first functionality is active and in the second manner if the second functionality is active. For instance, on a touch screen, there might be the need to draw a field from the left-hand side to the right-hand side in the first functionality, and the other way around from the right-hand side to the left-hand side if the second functionality is active. There might also be variations in the pressure needed for activating the functionality.

If the activation of the second functionality is not identified by the user and the call is considered released, then the call shall be released automatically after a second predefined period. This second period (or "time frame") starts when the calling party tries to release the call via normal release function if the condition that the first timer is still running and is the timeframe during which the calling party has to decide on whether to reverse the release call action and continue with the established connection or to confirm the release of the connection. If no action is performed from the user then the calling device considers that the call shall be released as the user initially intended. This second timer is deactivated on expiration time, on selection by the user to continue with the connection or on confirmation by the user to release the call.

The method of operating an apparatus for audio and/or video communication includes the steps of:

receiving input for calling with the apparatus for audio and/or video communication another apparatus for audio and/or video communication, and calling the other apparatus, and receiving input via a release input means, configured for terminating the call.

The method further includes that if a first condition is met, the input for the release input means leads to immediate terminating of the call, and, if the first condition is not met, the input to the release input means leads to terminating the call only if a second condition is met, or leads not to any termination of the call until a termination timer expires.

Hence, the apparatus of the kind explained above might be used, and the first condition might relate to a stable communication.

The first condition may include that a first call has been accepted and that the duration since the call has been accepted is lower than a predetermined period. It is preferred to reactivate the possibility of release.

Furthermore, a preferred embodiment is that the second condition includes that an input is received for confirming the desire to terminate the call.

The further method of operating an apparatus for audio and/or video communication includes the steps of.

receiving a call from another apparatus for audio and/or video communication.

receiving input to accept the call, and receiving input to terminate the call via release input means, wherein, if a first condition is met, the receiving of input to terminate the call via the release input means leads to immediate terminating of the call If the first condition is not met, the receiving of input to terminate the call via the release input means leads to terminating the call only if a second condition is met, or leads not to any immediate termination of the call Hence, here, from the receiver's side, the status of communication is defined, and the activation of the two conditions depends on the status of communication.

The first condition may include that the duration since the call has been accepted is lower than a predetermined period. Moreover, a further preferred embodiment is that the second condition includes that an input is received for confirming the desire to terminate the call. At last the second condition is also met if no input is received for confirming the desire to terminate the call after a second predetermined period of time.

The above inventions and their advantages become more readily apparent from the detailed description which follows hereunder, made with reference to the drawings

BRIEF DESCRIPTION OF THE DRAWINGS

FIG. 3a is a diagram showing a sequence of the steps between a caller device and a called device in the first situation.

DESCRIPTION OF PREFERRED EMBODIMENTS

Figure 1:
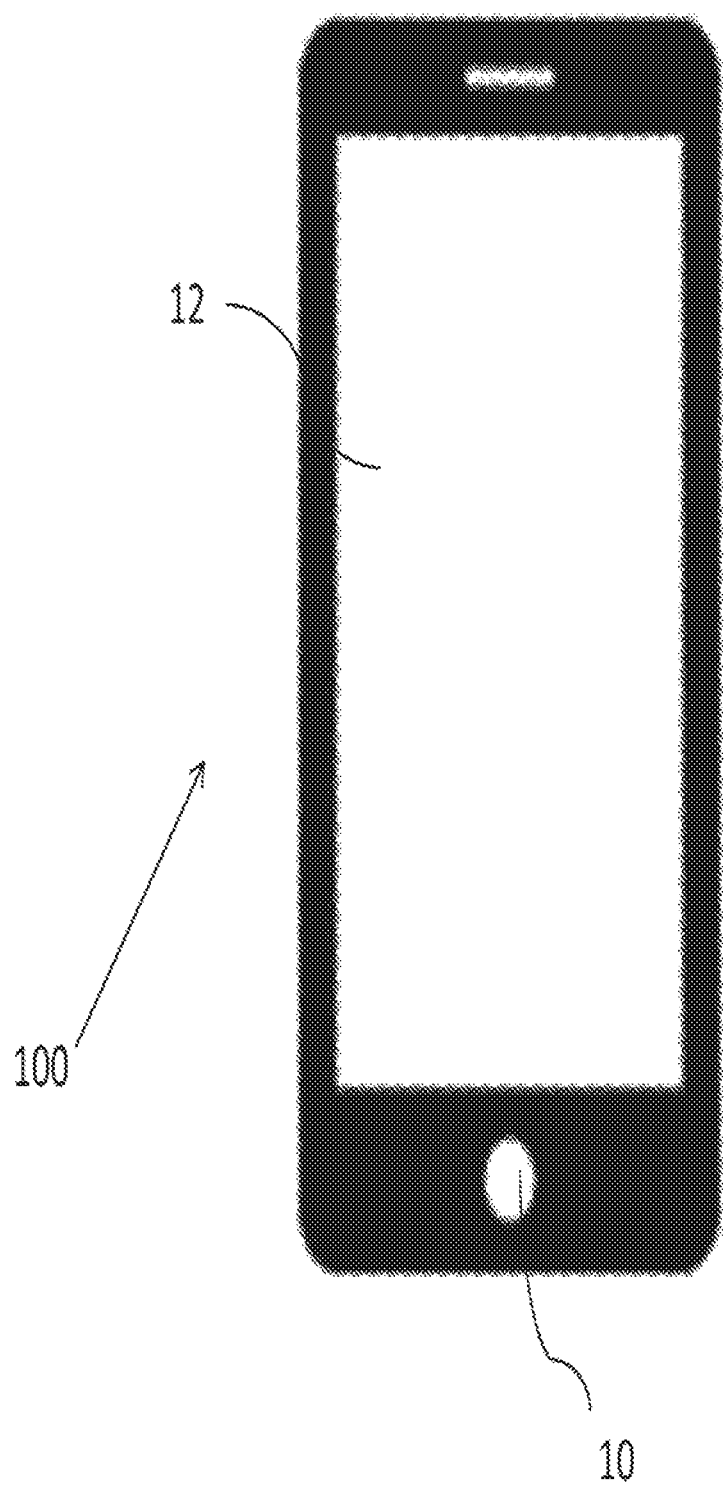
FIG. 1 is a top plan view of an apparatus for audio and/or video communication which might be configured in an inventive manner.

FIG. 1 exemplarily depicts a smartphone 100 as an example for an apparatus for audio and/or video communication. The smartphone 100 includes a button 10 to initiate a touch field 12 for providing inputs via the same. Via such touch field 12, one can initiate in a well-known manner communication with another smartphone, i.e. with another apparatus for audio and/or video communication.

Figure 2:
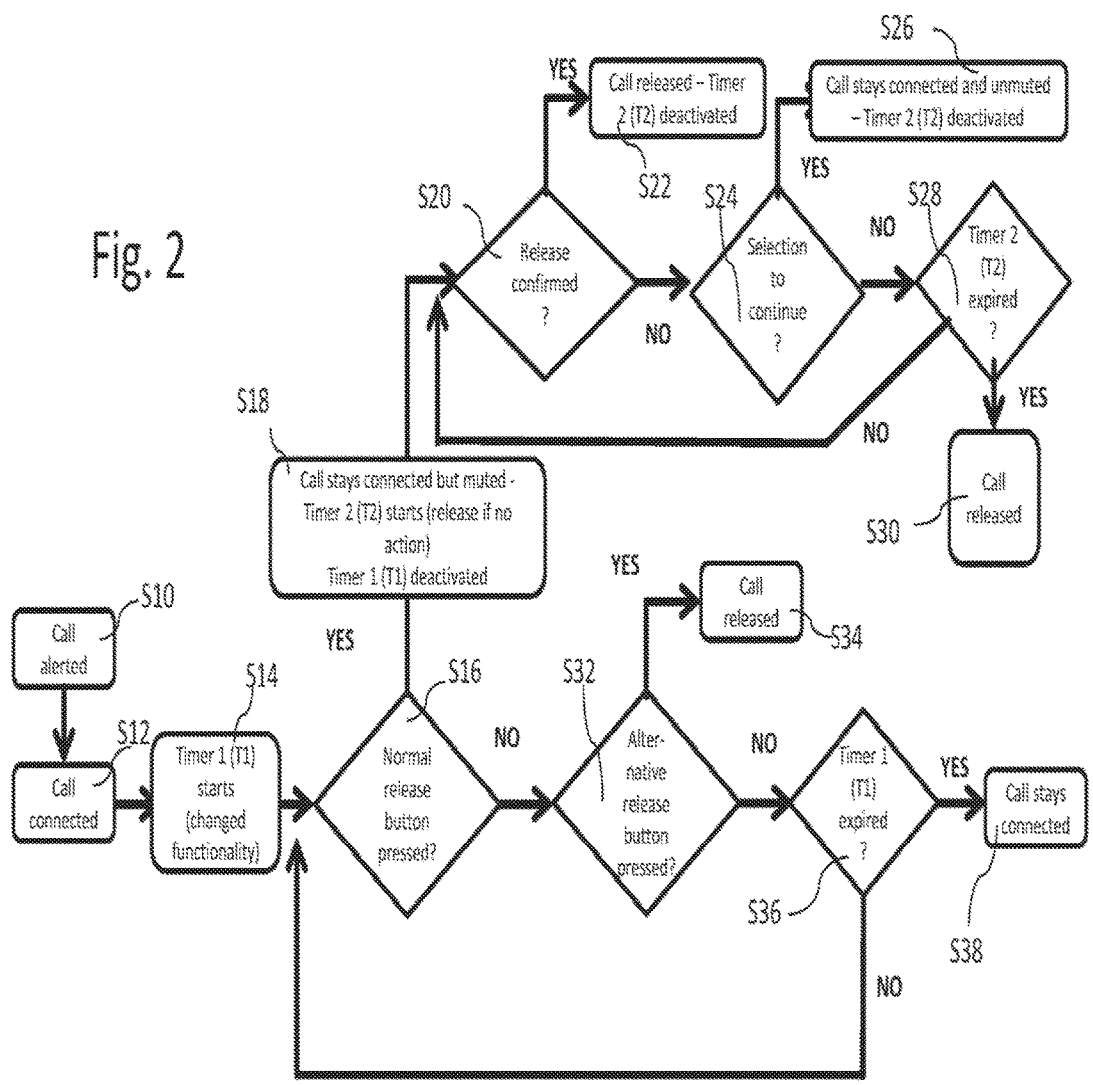
FIG. 2 is a flowchart of the inventive method.

FIG. 2 illustrates exemplarily steps of an embodiment of the inventive method. Starting with alerting a call in step S10, a call becomes connected in step S12. Then, in step S14, immediately a timer (T1) starts running This is the timer (T1) defining the period during which the release functionality is modified and the described mechanism is activated. As mentioned above, it might happen that a release button is pressed. In step S16, it is determined whether or not a normal release button is pressed. In the affirmative, the call stays first connected according to step S18, but a second timer (T2) is started determining the period during which the user can confirm the call release or select to continue with the connected call, the call is muted until the user decides for further actions and the initial timer (T1) is not needed now and is deactivated. In step S20, it is determined whether a release is confirmed. This might be done by using the same normal release button or by some other input means defined accordingly. In the affirmative, then, the call is released and timer (T2) is also deactivated, step S22 In case the release is not confirmed, in step S24 it is determined as to whether a selection is made to continue the call following the pressing of the normal release button hi the affirmative, the call stays connected according to step S26, the second tinier (T2) is deactivated and the call is un-muted moving to normal connection. In case the selection to continue did not take place, it is determined in step S28 whether the timer started in step S18 has expired in the meantime in the affirmative, the call is released in step S30 In case the timer is not yet expired, the method returns to step S20.

In case no normal release button has been pressed as determined in step S16, there is again the determination in step S32 whether or not an alternative release button has been pressed. If so, the call is released in step S34. If not, it is determined in step S36 whether the tinier started in step S14 (T1) has expired. If not, the method returns to step S16. If the timer has expired, the call stays connected in step S38.

The entire method described in FIG. 2 may be put into practice only in parts. For instance, the confirmation of the release or the selection to continue might be omitted, with the method ending with step S18. This implies that functions required for the next steps will also be omitted like (T2) and muted mechanism Furthermore, the alternative determination in step S32 might be omitted. Other combinations of the above components might further apply.

Explaining the above with respect to a diagram showing which data are sent. FIG. 3a depicts a caller device and a called device. In the initial stage, step S40 is setup of a signal sent from the caller device to the called device. Then, the called device answers with an alert signal, step S42, and there is a connection in step S44, which triggers the counting of a timer in step S46. If a release request in step S48 internal to the caller device is active as long as the timer has not yet expired, the release request is denied as handled internally in the caller device in step S50.

Figure 3B:
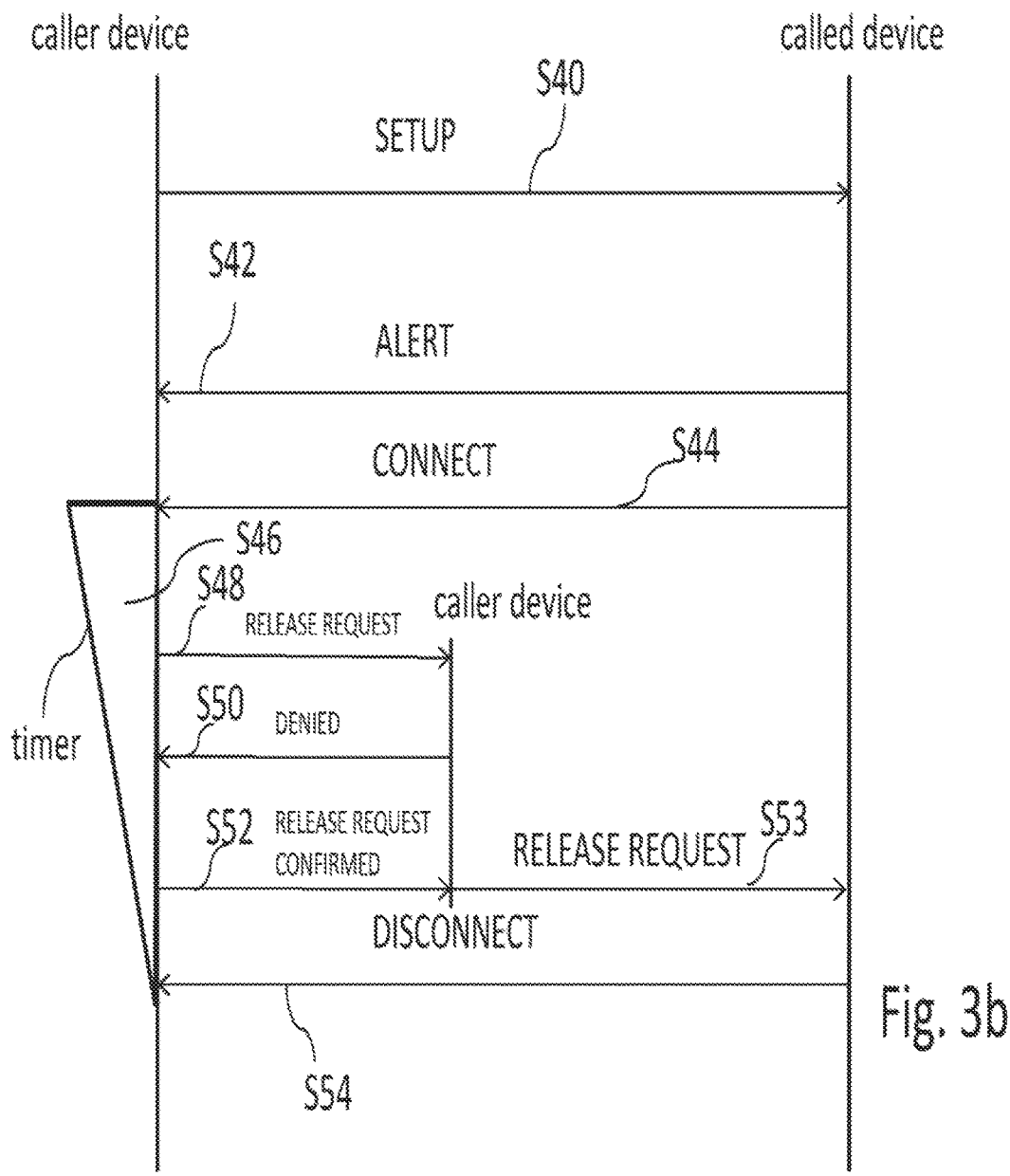
FIG. 3b is a diagram showing such a sequence in a second situation.

FIG. 3b is identical to FIG. 3a, but with the additional step S52 of internally confirming the release request, of sending the release request to the other party according to step S53, and a disconnect step S54.

Figure 3C:
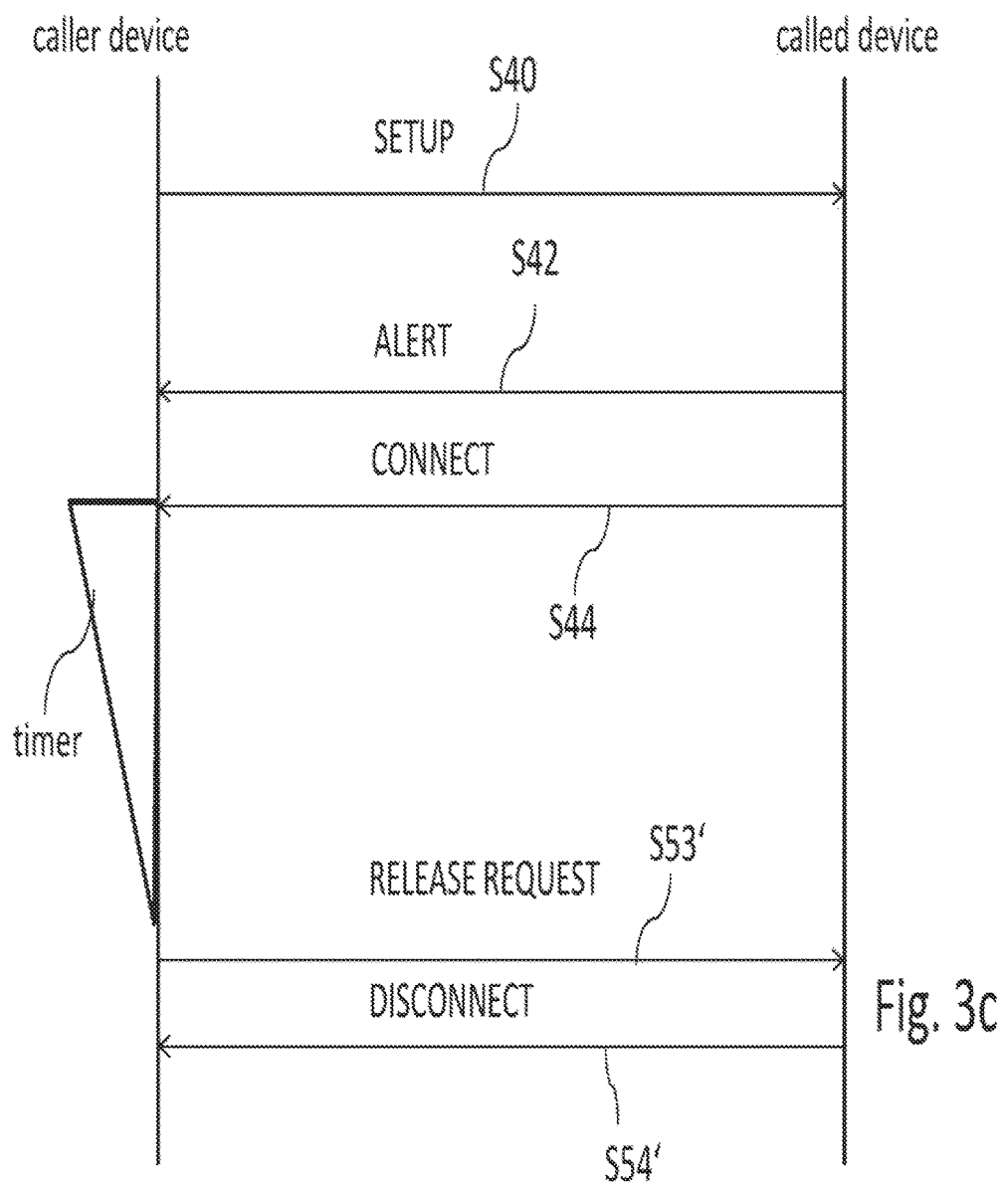
FIG. 3c is a diagram showing such a sequence in a third situation.

FIG. 3c shows a situation similar to FIG. 3a, but there, the release request in step S53' takes place after expiry of the timer, and there is an immediate disconnection in step S54'.

Figure 4A:
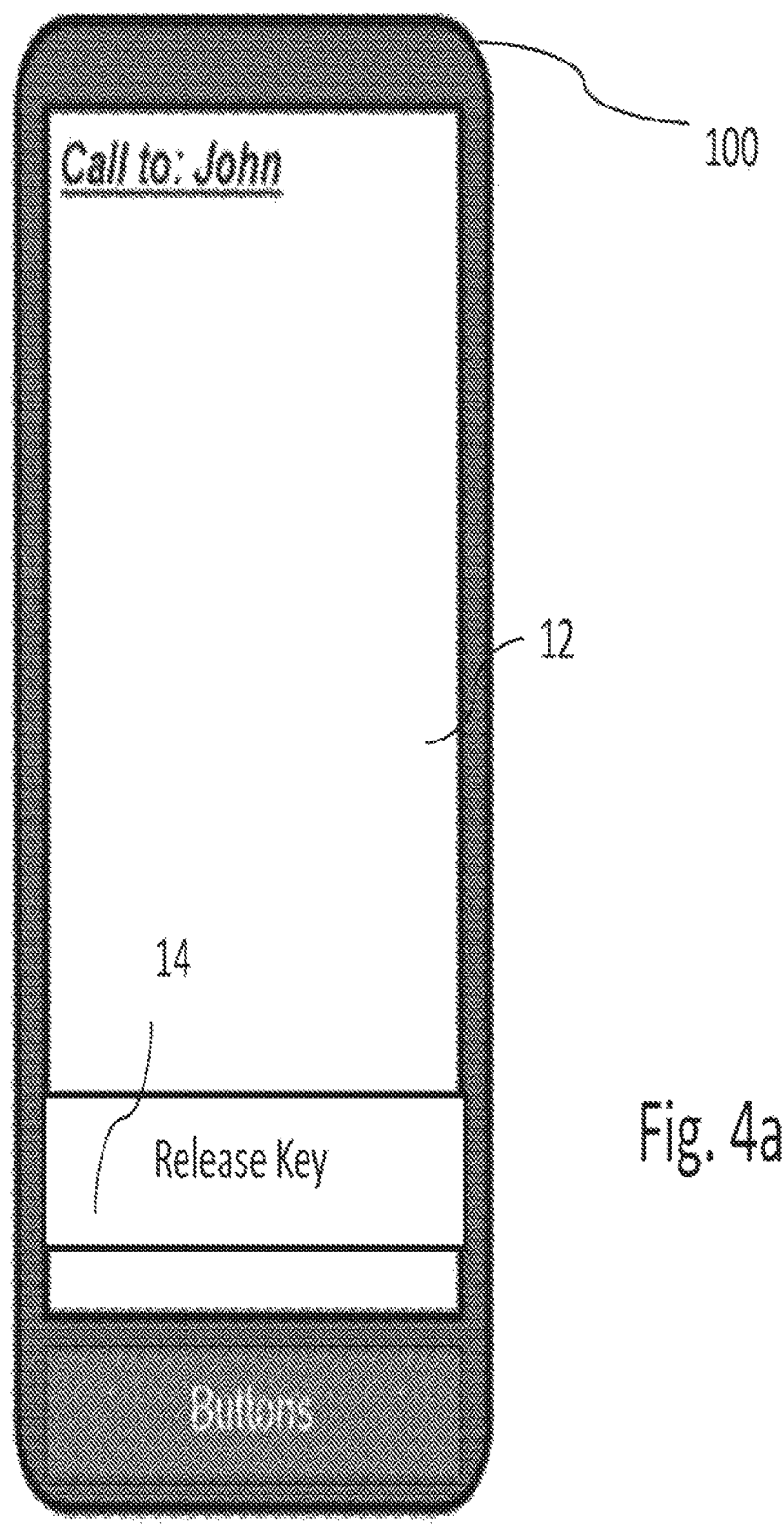
FIGS. 4a to 4c are top plan views of a smartphone showing the display on the smartphone when an inventive method is performed.
Figure 4B:
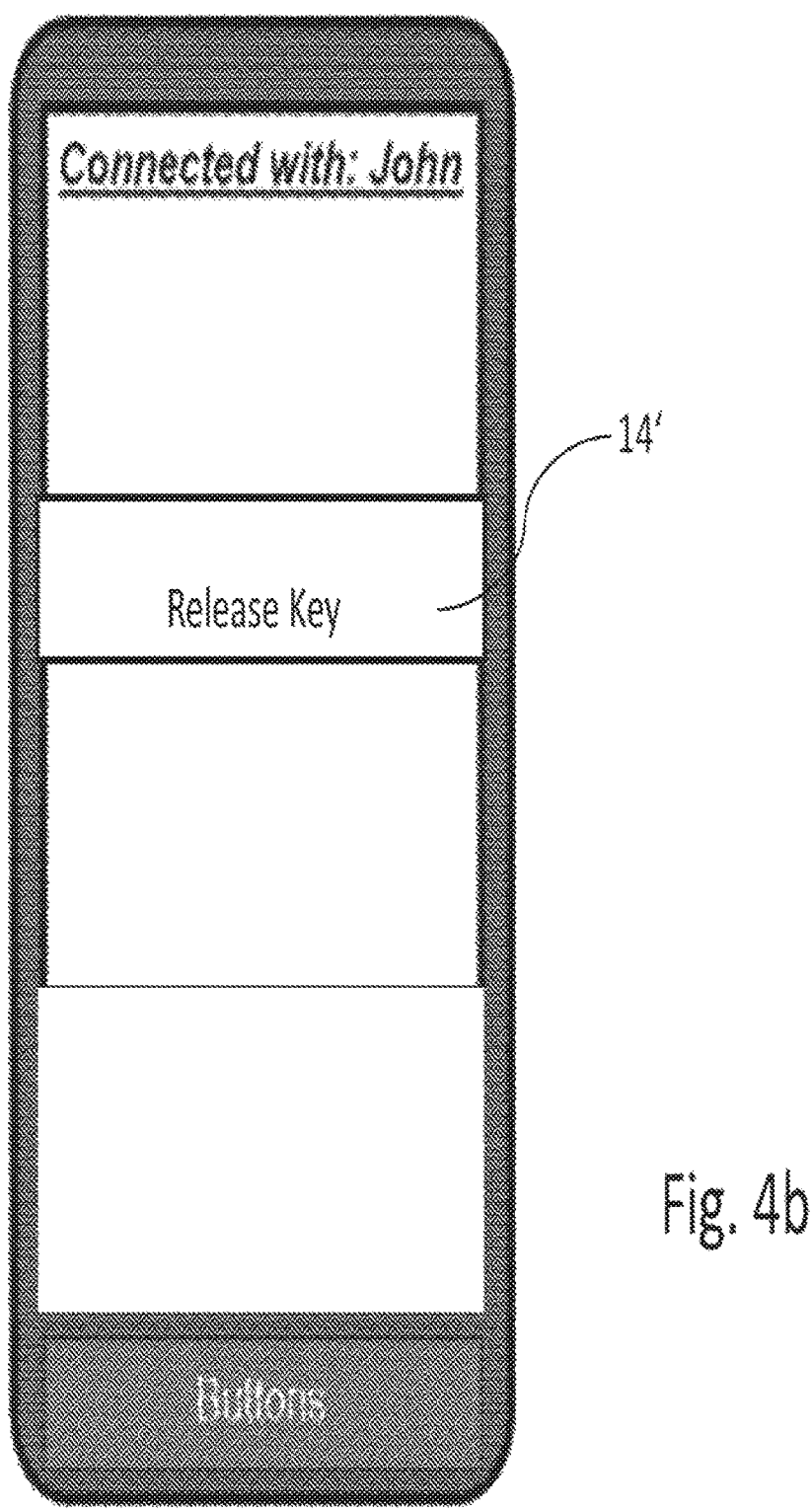
Figure 4C:
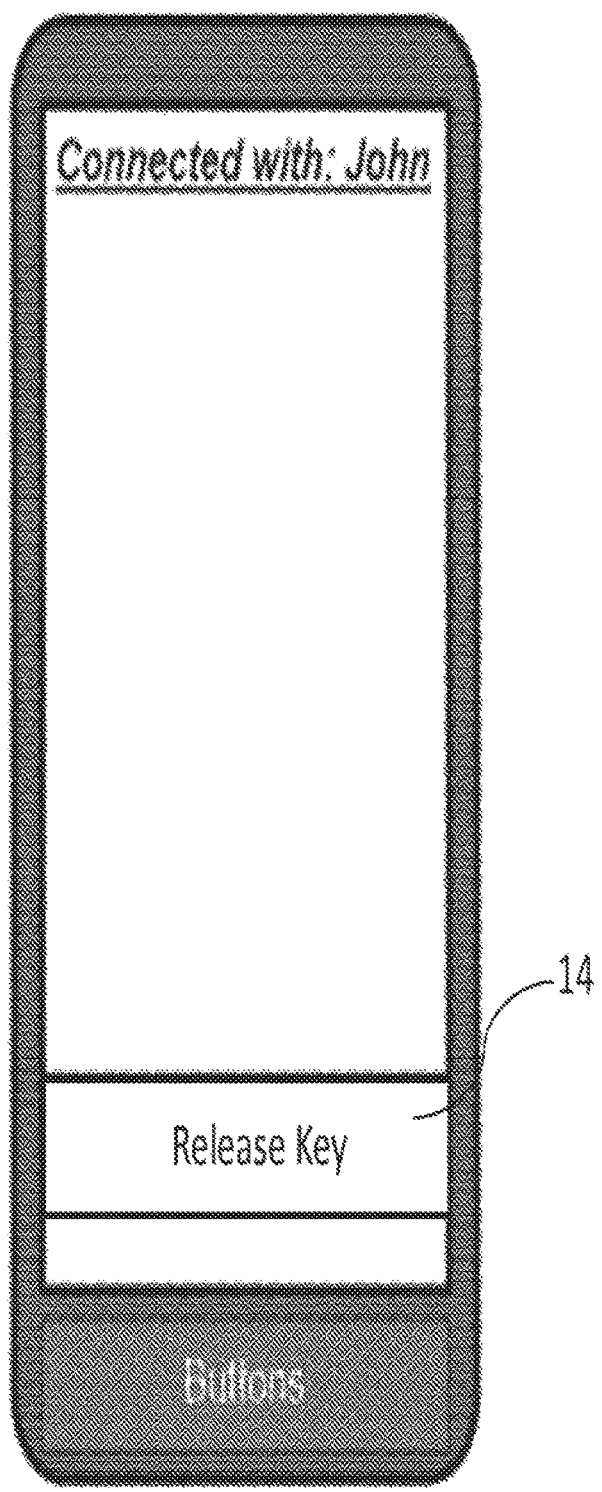

FIGS. 4a to 4c illustrate what happens during activation of the further functionality of the release key. In the smartphone 100, a call to addressee "John" has been started. Then, instead of the usual release key 14, which key is active instead in the lower portion of the touch field 12 of smart phone 100, goes to a middle-upper portion thereof, thereby providing the release key 14'. This situation is according to FIG. 4b is a situation that John has accepted the call, and the smartphone is connected. Once the timer has expired, the release key returns to the position indicated at 14 in FIG. 4c.

Figure 4D:
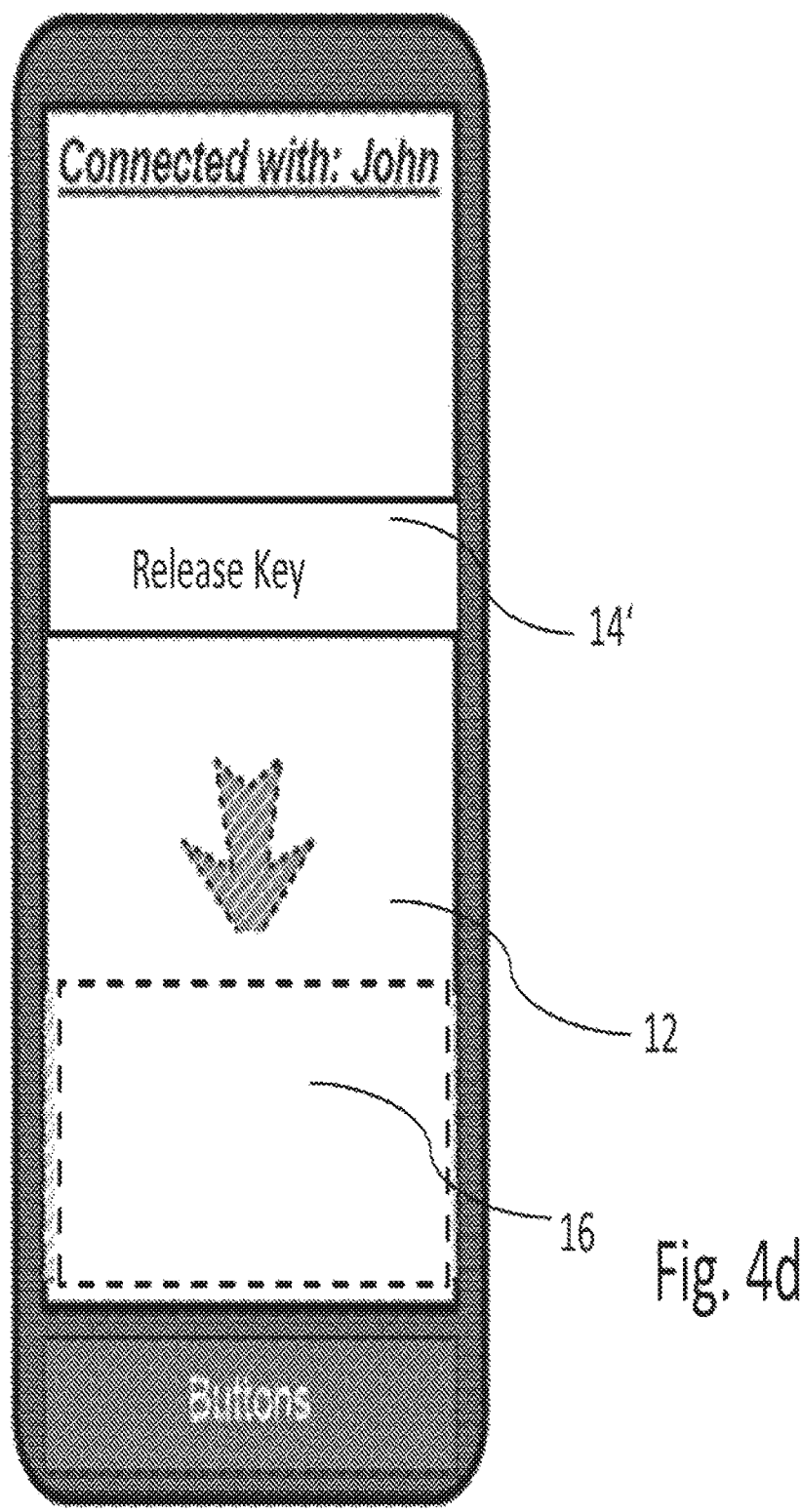
FIGS. 4d to 4f are top plan views of a smartphone showing the display on the display on a smartphone in a further situation.
Figure 4E:
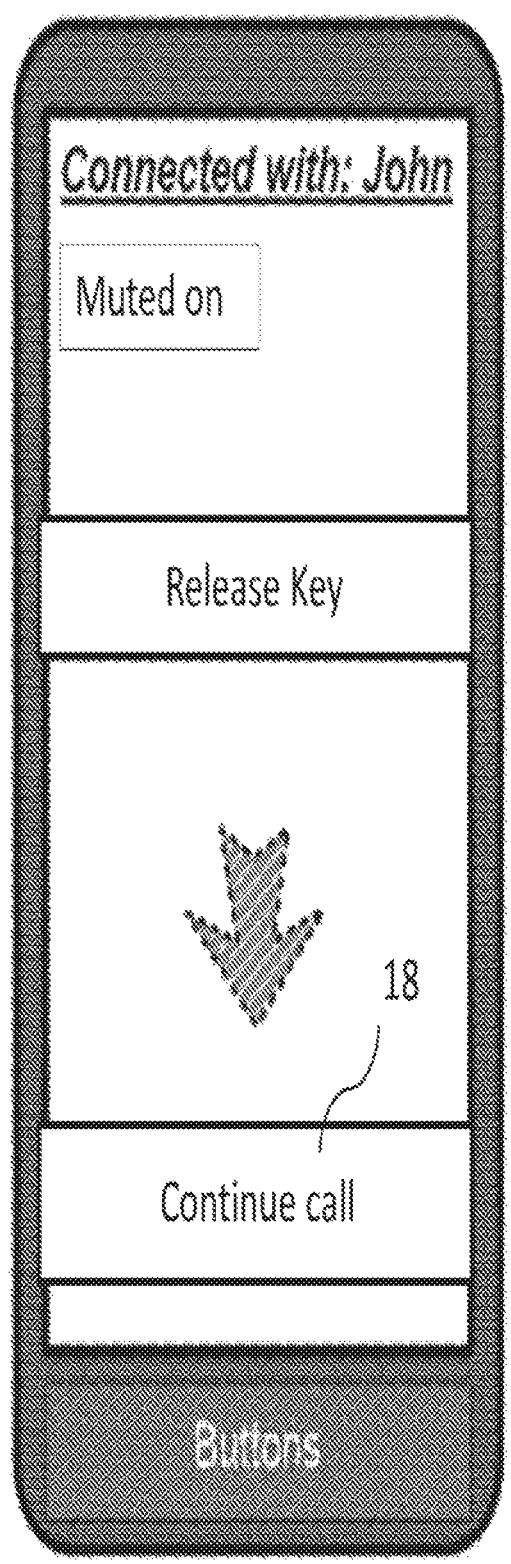
Figure 4F:
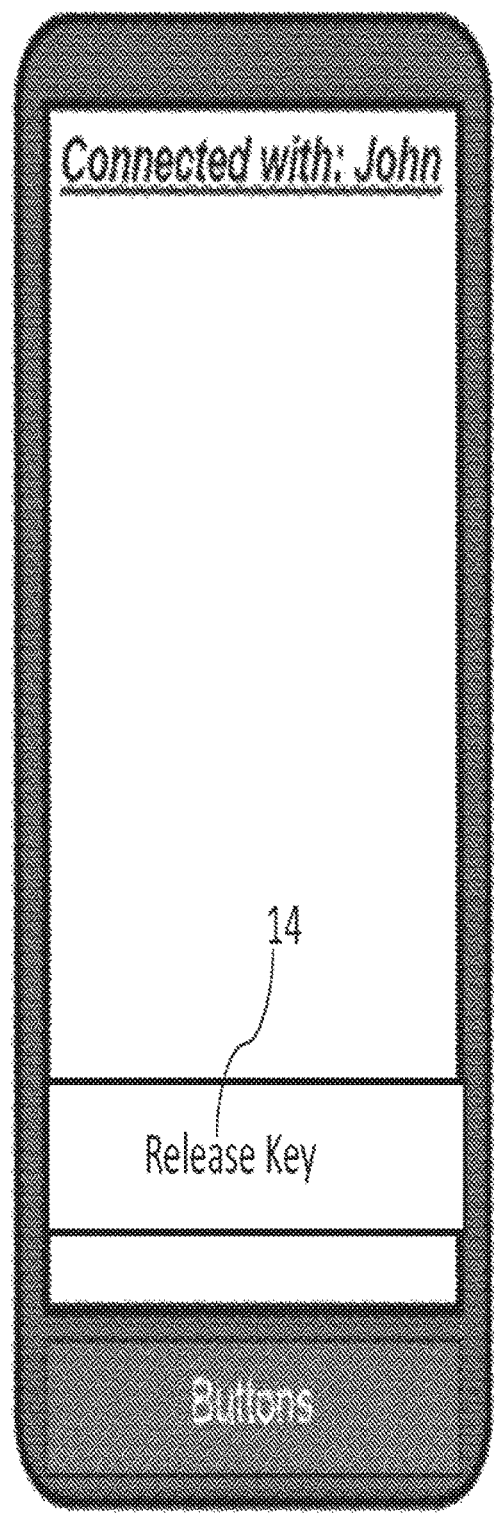

Additionally, starting from the situation of FIG. 4b, shown again in FIG. 4d, in the lower portion of the touch field, there is nothing displayed, but there is still a field 16 active, which when touched provides a specific functionality and prompts to continue with the call. So, if the smartphone is connected with the addressee "John", and if the release key is in the position indicated at 14', then the lower portion 16 allows, once the release key has been pressed, to continue with the call, as indicated at 18 in FIG. 4e. The active microphone is muted. In the situation according to FIG. 4f, the initial situation is returned to again. The smartphone is connected, however, with John. Any pressing of the release key 14 leads to termination of the call.

What is claimed is:

1. A first telecommunication apparatus comprising:
a processor communicatively connected to a non-transitory computer readable medium;
the first telecommunication apparatus configured to receive call connection input to facilitate establishment of a call for audio communication and/or video communication with a second telecommunication apparatus for audio communication and/or video communication to establish a communication session with the second telecommunication apparatus;
the first telecommunication apparatus configured to respond to a first input for releasing the call to terminate the communication session that is received within a first pre-selected time period after the communication session is established by muting the call and maintaining the muting of the call until:
  (a) a second pre-selected time period passes after the first input is received without a second input being received that confirms the releasing of the call, the first telecommunication apparatus terminating the call when the second pre-selected time period passes after the first input is received without the second input being received,
  (b) a third input is received within the second pre-selected time period, the first telecommunication apparatus unmuting the call and maintaining the communication session in response to receiving the third input within the second pre-selected time period, or
  (c) the second input is received within the second pre-selected time period, the first telecommunication apparatus responding to the second input by releasing the call for termination of the communication session.

2. The first telecommunication apparatus of claim 1, wherein the first telecommunication apparatus is a smart phone or an electronic tablet.

3. The first telecommunication apparatus of claim 1 wherein the first telecommunication apparatus is configured to respond to the first input for releasing the call to terminate the communication session that is received within the first pre-selected time period after the communication session is established by muting the call and maintaining the muting of the call until (a) the second pre-selected time period passes after the first input is received without the second input being received that confirms the releasing of the call, the first telecommunication apparatus terminating the call when the second pre-selected time period passes after the first input is received without the second input being received.

4. The first telecommunication apparatus of claim 1, wherein the second input is providable via contact with a second pre-defined area of a display that is located on a location of the display that is positioned away from a side of a first pre-defined area of the display that is defined for providing of the first input.

5. The first telecommunication apparatus of claim 4, wherein the second pre-defined area is in a middle portion of the display and the first pre-defined area is adjacent an end of the display.

6. The first telecommunication apparatus of claim 4, wherein the second pre-defined area is located on a location of a display that is above the first pre-defined area.

7. The first telecommunication apparatus of claim 4, wherein:
the first pre-defined area defines a touch field of a display for a release key or icon; and
the second pre-defined area defines a touch field of the display for a release key or icon.

8. The first telecommunication apparatus of claim 7, wherein the second pre-defined area is in a middle portion of the display and the first pre-defined area is adjacent an end of the display.

9. The first telecommunication apparatus of claim 4, wherein:
the first pre-defined area defines a touch field of the display for a release key or icon; and
the second pre-defined area defines a touch field of the display for a release key or icon.

10. The first telecommunication apparatus of claim 1, wherein the first telecommunication apparatus is configured to utilize a first timer for defining the first pre-selected time period.

11. The first telecommunication apparatus of claim 1, wherein the first telecommunication apparatus is configured to utilize a second timer for defining the second pre-selected time period.

12. The first telecommunication apparatus of claim 1, wherein the first telecommunication apparatus is configured to adjust a mechanical state, acoustic emission state, and/or a display state to provide indicia that a status of audio and/or video communication requires confirmation for a release of the call.

13. The first telecommunication apparatus of claim 1, wherein the first telecommunication apparatus is configured to respond to the first input for releasing the call to terminate the communication session that is received within the first pre-selected time period after the communication session is established by muting the call and maintaining the muting of the call until (a) the second pre-selected time period passes after the first input is received without the second input being received that confirms the releasing of the call, the first telecommunication apparatus terminating the call when the second pre-selected time period passes after the first input is received without the second input being received, or (c) the second input is received within the second pre-selected time period, the first telecommunication apparatus responding to the second input by releasing the call for termination of the communication session.

14. A method of operating a first telecommunication apparatus for audio and/or video communication, comprising:
    receiving input for calling with said first telecommunication apparatus for audio and/or video communication with a second telecommunication apparatus for audio and/or video communication, the first telecommunication apparatus comprising a non-transitory computer readable medium connected to a processor;
    the first telecommunication apparatus initiating a call to said second telecommunication apparatus in response to the received input to establish a communication session;
    in response to a first input for releasing the call to terminate the communication session that is received within a first pre-selected time period after the call is connected to establish the communication session, the first telecommunication apparatus muting the call,
    the first telecommunication apparatus maintaining the muting of the call until:
    (a) a second pre-selected time period passes after the first input is received without a second input being received that confirms the releasing of the call, the first telecommunication apparatus terminating the call when the second pre-selected time period passes after the first input is received without the second input being received,
    (b) a third input is received within the second pre-selected time period, the first telecommunication apparatus unmuting the call and maintaining the communication session in response to receiving the third input within the second pre-selected time period, or
    (c) the second input is received within the second pre-selected time period, the first telecommunication apparatus responding to the second input by releasing the call for termination of the communication session.

15. The method of claim 14, comprising:
    the first telecommunication apparatus responding to receipt of the second input within the first pre-selected time period by releasing the call for termination of the communication session.

16. The method of claim 14 wherein the first telecommunication apparatus is a smart phone or an electronic tablet.

17. The method of claim 14, wherein the first telecommunication apparatus maintaining the muting of the call until: (a) the second pre-selected time period passes after the first input is received without the second input being received that confirms the releasing of the call, the first telecommunication apparatus terminating the call when the second pre-selected time period passes after the first input is received without the second input being received.

18. The method of claim 14, wherein the second input is providable via a second pre-defined area of a display and the first input is providable via a first pre-defined area of the display that is spaced away from the second pre-defined area.

19. The method of claim 18, wherein the second pre-defined area is in a middle portion of the display and the first pre-defined area is adjacent an end of the display.

20. The method of claim 18, wherein the second pre-defined area is below the first pre-defined area.

* * * * *